US006740231B1

(12) United States Patent
Bauman et al.

(10) Patent No.: US 6,740,231 B1
(45) Date of Patent: May 25, 2004

(54) SELF-CONTAINED COOLING SYSTEM FEED AND BLEED SYSTEM

(75) Inventors: Scott D. Bauman, Hudson, OH (US); David L. Adams, Chagrin Falls, OH (US); James W. Beard, Chagrin Falls, OH (US); Monte Krier, Naperville, IL (US)

(73) Assignee: Nalco Company, Naperville, IL (US)

( * ) Notice: Subject to any disclaimer, the term of this patent is extended or adjusted under 35 U.S.C. 154(b) by 0 days.

(21) Appl. No.: 09/903,466

(22) Filed: Jul. 11, 2001

(51) Int. Cl.[7] ................................................. C02F 5/08
(52) U.S. Cl. ...................... 210/96.1; 210/139; 210/143; 210/167; 210/199; 210/206; 210/258; 210/149; 422/108; 422/110; 422/116
(58) Field of Search ................................ 210/696, 96.1, 210/101, 109, 138, 139, 143, 167, 195.1, 198.1, 199, 206, 257.1, 258, 149; 422/105, 108, 110, 116; 261/DIG. 46

(56) References Cited

U.S. PATENT DOCUMENTS

| | | | | | |
|---|---|---|---|---|---|
| 3,592,212 A | * | 7/1971 | Schleimer et al. | ............ | 137/93 |
| 3,759,387 A | * | 9/1973 | Drayton, Jr. | .................. | 210/98 |
| 4,273,146 A | * | 6/1981 | Johnson | .......................... | 137/5 |
| 4,464,315 A | * | 8/1984 | O'Leary | ...................... | 261/110 |
| 4,648,043 A | * | 3/1987 | O'Leary | ...................... | 700/285 |
| 5,294,916 A | * | 3/1994 | Bolton et al. | ................ | 340/606 |
| 5,339,854 A | * | 8/1994 | Leith | .............................. | 137/2 |
| 5,403,521 A | * | 4/1995 | Takahashi | ..................... | 261/26 |
| 5,611,920 A | * | 3/1997 | Simpson et al. | ............. | 210/192 |
| 5,855,791 A | * | 1/1999 | Hays et al. | .................. | 210/696 |
| 6,315,909 B1 | * | 11/2001 | Hoots et al. | ................. | 210/745 |

* cited by examiner

Primary Examiner—Peter A. Hruskoci
(74) Attorney, Agent, or Firm—Margaret M. Brumm; Thomas M. Breininger

(57) ABSTRACT

Apparatuses, systems and methods for monitoring and/or controlling treatment of aqueous systems including water cooling systems are provided. The present invention includes a self-contained treatment unit for controllably bleeding water from an aqueous system and delivering treatment agents, such as inhibitor agents and/or anti-biofouling agents, to treat conditions, such as scale, corrosion, biofouling or the like within the aqueous system.

14 Claims, 3 Drawing Sheets

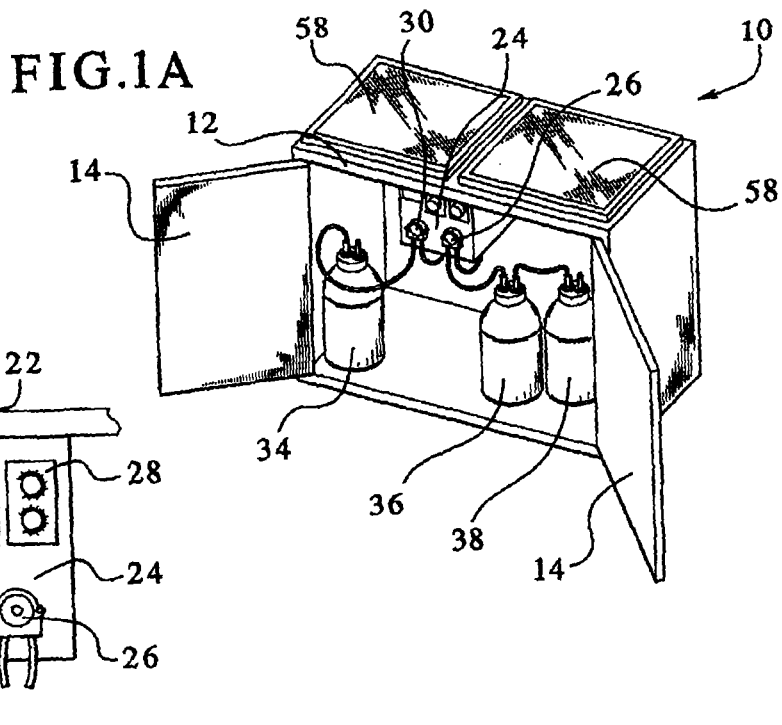
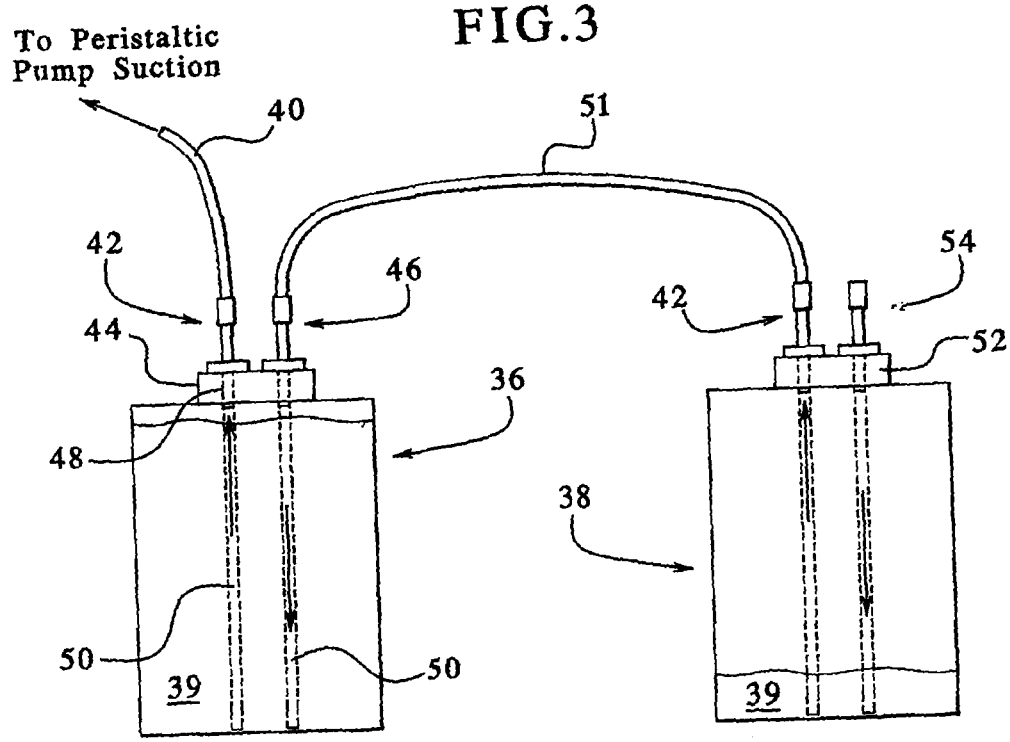

SELF-CONTAINED COOLING SYSTEM FEED AND BLEED SYSTEM

FIELD OF THE INVENTION

The present invention relates generally to apparatuses, methods and systems for monitoring and/or controlling water treatment More specifically, the present invention relates to apparatuses, methods and systems for monitoring and/or controlling water treatment of aqueous systems, such as water cooling systems or other like industrial water systems.

BACKGROUND OF THE INVENTION

Most industrial waters contain alkaline earth metal cations, such as calcium, barium, magnesium, and several anions, such as bicarbonate, carbonate, sulfate, oxalate, phosphate, silicate and fluoride. When combinations of these anions and cations are present in concentrations which exceed the solubility of their reaction products, precipitates can form until the product solubility concentrations are no longer exceeded. For example, when the concentrations of calcium ion and carbonate ion exceed the solubility of the calcium carbonate reaction products, a solid phase of calcium carbonate will form.

Solubility product concentrations are exceeded for various reasons, such as partial evaporation of the water phase, change in pH, pressure or temperature, and the introduction of additional ions which form insoluble compounds with the ions already present in the solution. As these reaction products precipitate on surfaces of the water carrying system, they form scale or deposits. This accumulation prevents effective heat transfer, interferes with fluid flow, facilitates corrosive processes and harbors bacteria This scale is an expensive problem in many industrial water systems causing delays and shutdowns for cleaning and removal.

Many other industrial waters, while not being scale forming, tend to be corrosive. Such waters, when in contact with a variety of metal surfaces such as ferrous metals, aluminum, copper and its alloys, tend to corrode one or more of such metals or alloys. A variety of compounds have been suggested to alleviate these problems. Such materials are low molecular weight polyacrylic acid polymers. Corrosive waters of this type are usually acidic in pH and are commonly found in closed recirculating systems.

Numerous compounds have been added to these industrial waters in an attempt to prevent or reduce scale and corrosion. One such class of materials are the well known organophosphonates which are illustrated by the compounds hydroxyethylidene diphosphonic acid (HEDP) and phosphonobutane tricarboxylic acid (PBTC). Another group of active scale and corrosion inhibitors are the monosodium phosphinicobis (succinic acids)

Biofouling has also been problematic in industrial water systems, such as cooling towers, heat exchangers and air washers, because it can also adversely affect heat transfer efficiency and fluid frictional resistance, thereby subsequently reducing production rates. In addition, biofouling can also play an important role in microbiologically influenced corrosion.

Biofouling can occur when microorganisms attach to inert surfaces forming aggregates with a complex matrix consisting of extracellular polymeric substances. This consortium of attached microorganisms and the associated extracellular polymeric substances is commonly referred to as a biofilm.

The most common way to control biofouling is through the application of chemical biocides such as chlorine, bromine, isothiazolones, glutaraldehyde or other antimicrobials. These biocides are added in an attempt to kill both planktonic and attached microorganisms.

In general, scale deposition, corrosion and/or biofouling of aqueous systems can be treated by adding a chemical and/or biological treatment agent to the aqueous system, typically via a controlled delivery device. Conventional treatment generally requires large containers of treatment chemicals, typically at least 5 gallons in size and often times 55 gallons in size or greater. Further, the installation of conventional water treatment systems typically includes installing piping and solenoid valves for tower bleed, electrical supply for a variety of pumps and controllers, electrical connections between pumps, controllers and solenoid valves, and tapping water lines for chemical feed points. The size and installation requirements of conventional water treatment systems of this type can be expensive as well as excessive (i.e., not practical), particularly with respect to smaller and/or medium-sized aqueous systems, to aqueous systems where installation services are scarce, expensive or where main power is limited or not available and the like. These types of aqueous systems are typically located at, for example, college and university campuses, office buildings, hotels, motels, emerging countries, demote locations or the like.

A need, therefore, exists to monitor and/or control water treatment of aqueous systems for scale deposition, corrosion, biofouling or the like to minimize costs and to increase the adaptability of treatment to such aqueous systems where conventional treatment can be difficult and even impractical to implement.

SUMMARY OF THE INVENTION

The present invention provides apparatuses, methods and systems for monitoring and/or controlling water treatment of aqueous systems, such as water cooling systems or other like industrial water systems. The present invention provides a self-contained treatment unit that can be controllably adapted to bleed or remove water from the aqueous system and to feed or deliver treatment agents to the aqueous system for treating scale, corrosion, biofouling, other like conditions or combinations thereof The self-contained treatment unit of the present invention can be readily installed without requiring extensive piping, electrical wiring, power from a main power source or the like. This allows the apparatus of the present invention to be suitably and desirably adapted for use, particularly with small to medium-sized aqueous systems, such as water cooling systems that have less than 100 ton capacity.

To this end, in an embodiment of the present invention, an apparatus for self-contained treatment of an aqueous system is provided. The apparatus includes a housing that encloses a controller, a feed pump and a treatment agent contained within one or more containers. The apparatus further includes a sensor that electrically communicates with the controller for measuring a parameter of water within the aqueous system, and q bleed pump that electrically communicates with the controller such that the controller controllably activates the bleed pump when the parameter is at or exceeds a predetermined level wherein the bleed pump removes water from the aqueous system upon activation. The feed pump also electrically communicates with the controller such that the controller controllably activates the feed pump during activation of the bleed pump wherein the feed pump acts to deliver the treatment agent to the aqueous system.

In another embodiment, an apparatus for monitoring and controlling treatment of a water cooling system is provided. The apparatus includes a self-contained treatment unit including a control device, an inhibitor feed pump and an inhibitor agent contained within one or more containers wherein the self-contained treatment unit is powered by a 12 volt power source. The apparatus further includes a conductivity sensor electrically communicating with the control device such that the conductivity sensor transmits a signal to the control device indicative of electrical conductivity of water within the aqueous system, and a submersible bleed pump electrically communicating with the control device such that the control device controllably activates the bleed pump when the signal is at or exceeds a preset value wherein the submersible bleed pump removes water from the water cooling system upon activation thereof. The inhibitor feed pump also electrically communicates with the control device such that the control device controllably activates the inhibitor feed pump wherein the inhibitor feed pump acts to deliver the inhibitor agent to the water cooling system for treating scale and/or corrosion.

In yet another embodiment, a system for monitoring and controlling treatment of an aqueous system is provided. The system includes a sensor located within the aqueous system for measuring a parameter of water within the aqueous system which is capable of varying with respect to changes in the aqueous system due to scale, corrosion and/or biofouling; a submersible bleed pump for removing water from the aqueous system; and a self-contained treatment unit electrically communicating with the sensor and the submersible bleed pump such that the self-contained treatment unit controllably activates the submersible bleed pump to remove water from the aqueous system when the parameter of the water is at or exceeds a predetermined level. The self-contained treatment includes a housing for enclosing a controller, an inhibitor feed pump and an inhibitor agent contained within one or more containers wherein the controller controllably activates the inhibitor feed pump to deliver the inhibitor agent to the aqueous system during activation of the submersible bleed pump.

In still yet another embodiment, a method of monitoring and controlling treatment of an aqueous system is provided The method comprises the steps of providing a self-contained treatment unit comprising a housing for enclosing an inhibitor feed pump, an inhibitor agent contained within one or more containers and a controller; measuring a water parameter sensitive to changes in the aqueous system due to scale, corrosion and/or biofouling; producing a signal indicative of the measured water parameter; transmitting this signal to the controller for controllably activating a submersible bleed pump to remove water from the aqueous system when the signal is at or exceeds a preset value; and controllably activating the inhibitor feed pump such that the inhibitor agent is delivered to the aqueous system during activation of the submersible bleed pump to treat scale and/or corrosion.

It is, therefore, an advantage of the present invention to provide apparatuses, systems and/or methods that employ a self-contained treatment unit for monitoring and controlling water treatment of an aqueous system.

Another advantage of the present invention is to provide a self-contained treatment unit that controllably activates or operates a number of pumps, sensors and other components for treating scale, corrosion and/or biofouling.

A further advantage of the present invention is to provide apparatuses, systems or methods that employ a self-contained treatment unit to controllably treat aqueous systems by bleeding or removing water from the system and feeding or delivering treatment agents to the system based on measured scale, corrosion and/or biofouling activity within the aqueous system.

Yet a still further advantage of the present invention is to provide a self-contained treatment unit that can be utilized to treat water from an aqueous system including a water cooling system or other like industrial water systems.

Still further an advantage the present invention is to provide a self-contained treatment unit that can be utilized to monitor and/or control water treatment of an aqueous system that can be readily installed and that is easily adaptable, particularly to small and/or medium-sized aqueous systems including aqueous systems which are located in remote areas or regions that are difficult to access.

Additional features and advantages of the present invention are described in, and will be apparent in, the detailed description of the presently preferred embodiment and the figures.

BRIEF DESCRIPTION OF THE DRAWINGS

FIGS. 1A and 1B are perspective views of the apparatus of the present invention. FIG. 1A is a perspective view of the treatment unit of the present invention. FIG. 1B is a perspective view of the controller of the treatment unit of the present invention.

FIG. 3 is a sectional view of hydraulically connected containers of the treatment unit as shown in FIG. 1A.

FIG. 4A illustrates a drip detector when detection is not interrupted. FIG. 4B illustrates a drip detector when detection has been interrupted.

DETAILED DESCRIPTION OF THE PRESENTLY PREFERRED EMBODIMENTS

The present invention provides apparatuses, systems and methods for monitoring and/or controlling water treatment of aqueous systems, particularly with respect to treatment of scale deposition, corrosion, biofouling, the like or combinations thereof. More specifically, the present invention includes a self-contained treatment unit for monitoring and/or controlling treatment of the aqueous system. The self-contained nature of the treatment unit allows for ready installment without requiring extensive, excessive and additional piping, electrical wiring, connections to a main power source or other like installment features characteristic of conventional water treatment systems that can bleed or remove water from and feed chemicals to the aqueous water system for treating scale, corrosion or other like process conditions.

As illustrated in FIGS. 1A and 1B, an embodiment of the self-contained treatment unit of the present invention is provided. The treatment unit 10 includes a housing 12 or enclosure for enclosing the component of the self-contained treatment unit. The housing 12 can include doors 14 or other like access panels to protect and access the components of the treatment unit 10.

The components can include a variety of different and suitable components for monitoring and/or controlling water treatment of aqueous systems, particularly with respect to treatment of scale deposition, corrosion and biofouling. In an embodiment, the components of the treatment unit include a controller or control device, a feed or delivery pump and a treatment agent contained within one or more containers. It should be appreciated that the present invention is not limited by the number, size and type of components of the treatment unit to the extent that the treatment unit is able to maintain its self-contained characteristics such that it can be easily and readily adapted for treating a variety of different aqueous systems, particularly smaller to medium-sized aqueous systems, such as water cooling systems that have less than 100 ton capacity.

Figure 2:
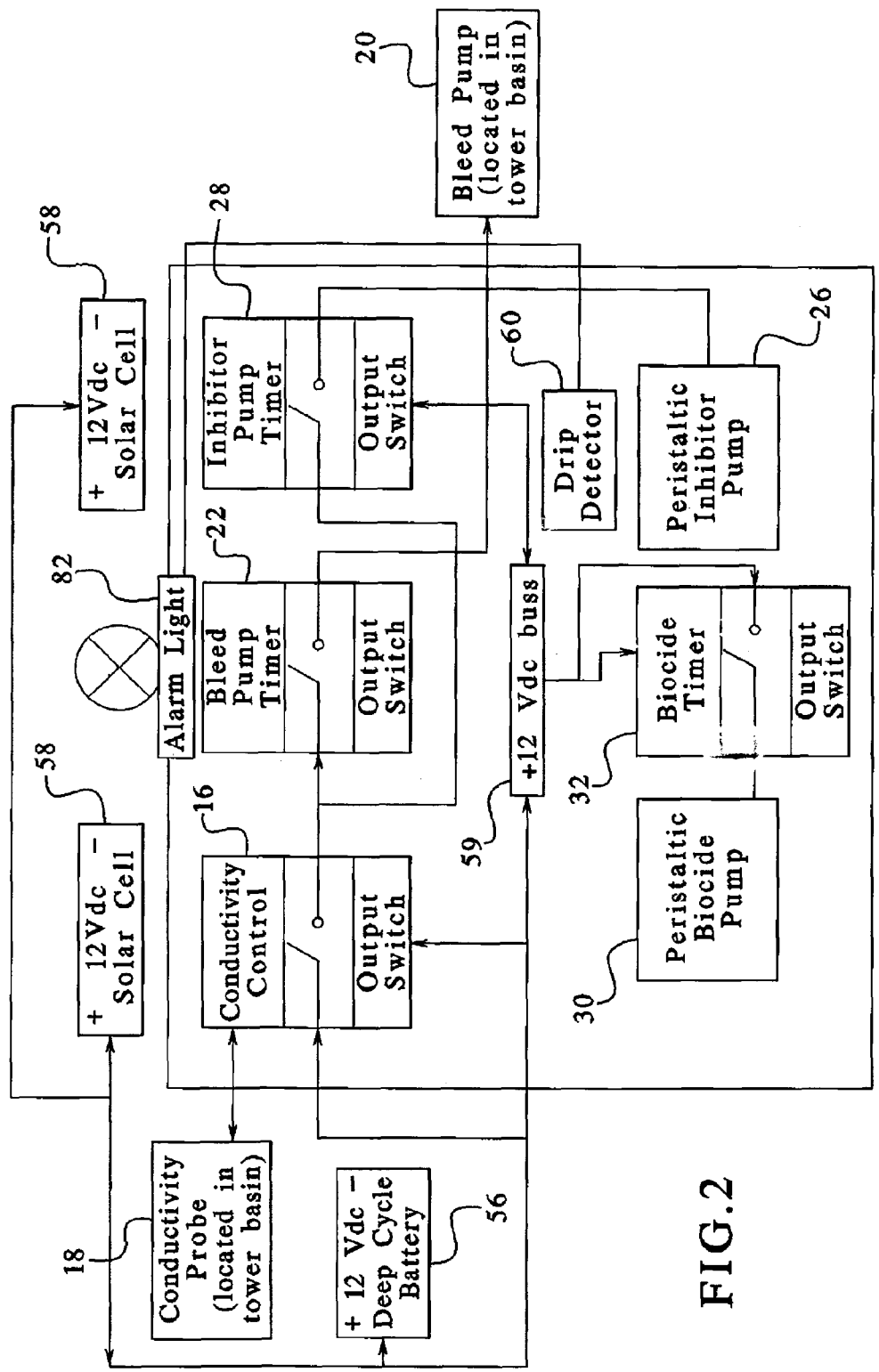
FIG. 2 is a schematic diagram illustrating the apparatus of the present invention that employs a self-contained treatment unit.

It should further be appreciated that the present invention can be configured in a variety of different, known and suitable ways. In an embodiment, the controller 16 is attached to the housing of the treatment unit. The controller 16 can include any suitable and known controller or control device. As shown in FIG. 2, in an embodiment, the controller 16 is electrically connected to a sensor 18 or a probe located within the aqueous system. The sensor 18 or probe is capable of measuring a parameter or characteristic of water within the aqueous system. The parameter can include a variety of different parameters, for example, those parameters that are sensitive to and can therefore vary with respect to changes in the aqueous system due to, for example, scale, corrosion and/or biofouling.

In a preferred embodiment, the sensor 18 includes a conductivity sensor for measuring the electrical conductivity of water within the aqueous system. It should be appreciated that the present invention can utilize a variety of different sensors depending on the type of parameter to be measured, such as oxidation/reduction potential, oxygen, temperature, piezoelectric transducer, capacitance, ion selective electrode, other like sensors, or combinations thereof.

As further shown in FIG. 2, the controller 16 is electrically connected to a pump 20 that is capable of removing or bleeding water from the aqueous system (i.e., a bleed pump). The pump 20 can include any known and suitable type of pump which can effectively and controllably remove the water while at the same time not deviating from the self-contained nature of the present invention. A submersible pump is the preferable choice of bleed pumps. A submersible pump can be easily placed with the aqueous system, such as within a tower basin of a cooling water system. In this regard, the submersible pump is well suited for maintaining the self-contained nature of the present invention as compared to bleeding water through a solenoid valve during conventional treatment which typically requires extensive wiring and piping.

In an embodiment, the controller 16 is electrically connected to the pump 20 via a timing device 22 as further illustrated in FIG. 2. The timing device can include a variety of known and suitable devices such that the removal of water can be controllably activated over a specified period of time. The timing device 22 can energize the bleed pump 20 based on an adjustable "on" time and "off" time. This allows for adjustment of the bleed pump rate while effectively providing a failsafe limit to total bleed output time and rate.

As shown in FIG. 1B, the timing device 22 can be mounted into a panel 24 attached within the housing 12 along with the controller 16 and other components, such as the feed pumps as detailed e In this regard, the operation of the treatment unit is facilitated because these components and others can be readily monitored from a central location, that is, from the panel 24 or control panel attached within the housing 12.

In an embodiment, the controller 16 is also electrically connected to the feed pump 26. Preferably, the controller 16 is electrically connected to the feed pump 26 via a timing device 28 to facilitate the controlled delivery of treatment agent to the aqueous system for treating scale, corrosion and/or biofouling. The timing device 28 can be utilized to energize the feed pump output rate based on an adjustable "on" and "off" time. This can provide an adjustable proportional feed based on bleed.

When, for example, a conductivity sensor measures a level of electrical conductivity in the water of the aqueous system that is at or exceeds a predetermined level, the controller 16 can activate, a submersible bleed pump via the electrical connection as previously discussed. During activation of the bleed pump, the controller can further activate the feed pump to deliver the desired treatment agent to the aqueous system. Water is returned to the aqueous system via a make-up valve or the like once the measured parameter, such as electrical conductance, is lowered below the setpoint The present invention is not limited to the type and number of feed pumps within the treatment unit. Any suitable feed pump is acceptable provided that the self-contained nature of the treatment unit can be maintained. In this regard, a suction pump, such as a peristaltic pump, is the preferred choice of pumps. As shown in FIGS. 1A and 1B, the feed pump can be suitably installed into the control panel along with the other components of the treatment unit. The suction feed pump can include a pair of feed lines for delivering the treatment agent to and away from the feed pump.

In an embodiment, the present invention includes a pair of suction feed pumps, such as peristaltic feed pumps or the like, as further illustrated in FIGS. 1A and 1B. The first feed pump 30 is for controllably delivering an anti-biofouling agent, such as a biocide, microbiocide or the like to the aqueous system for treating biofouling. A timing device 32 can also be coupled to the first feed pump as illustrated in FIG. 2. As with the other timing devices, this timing device can be a repeat cycle timing device. For example, it can be configured as a seven day repeating cycle timer for controlling the delivery of the anti-biofouling agent at selected intervals for selected periods of time. As shown in FIG. 1A, the first feed pump 30 is connected to a single container 34 which contains the anti-biofouling agent (not shown). However, the first feed pump 30 can be connected to more than one container, preferably containers that are hydraulically connected with one another as discussed below in detail. The number and size of containers is essentially limited to the extent that the self-containing nature of the present invention is not compromised and to the extent that a hydraulic connection cannot be made between the containers where applicable.

As further shown in FIGS. 1A and 1B, the second feed pump 26 is utilized to controllably deliver an inhibitor agent, such as a scale inhibitor, corrosion inhibitor or combination thereof, to the aqueous system. The second feed pump 26 or inhibitor feed pump can also be coupled to a timing device 28 as shown in FIG. 2 which functions to facilitate the controlled delivery of the inhibitor agent as previously discussed. The inhibitor feed pump 26 is connected to a first container 36 which connected to a second container 38 wherein the first and second containers each contain the inhibitor agent 39. Preferably, the first and second containers are hydraulically connected.

As shown in FIG. 3, the first container 36 is connected to the inhibitor feed pump 26 via a feed line 40. The feed line 40 can be of any known type such that the treatment agent can be suitably delivered therethrough. The feed line 40 is connected the first container 36 at a first connector 42, preferably a dry disconnector tube barb bulkhead fitting installed into an opening in a cap 44. This acts to desirably seal the container when the cap 44 is screwed onto or attached to the container in another like way. The cap 44 also includes another opening through which another connector 46 (i.e., a second connector), preferably identical to the first, is placed The cap 44 further includes another pair of connectors 48 attached to the bottom side at each of the openings. These connectors 48 are preferably fitted hose barbs each connected to a feed or suction line 50 that extends to the bottom of the first container.

The second connector 46 is connected to the second container 38 via a feed or suction line 51 at a connection attached to a cap 52, preferably in an identical arrangement as the first connector 42 and feed line 40 that connects to the feed pump 26. The second container 38 is preferably identical to the first container 36 except that one of the connectors 54 on top of the cap 52 is open or vents to the atmosphere. This allows air to enter as fluid is withdrawn into the first container 36.

Hydraulically, as the feed pump 26 operates, it creates a suction which draws fluid from the first container 36 to the feed pump 26. Because the first container 36 is sealed as discussed above, it creates a suction in the second container 38 as fluid or treatment agent 39 is drawn out of the first container 36. In this regard, the second container 38 empties or releases its contents to the first container 36 as the feed pump 26 acts to remove treatment agent 39 from the first container 36. Thus, because the invention automatically switches from an empty chemical container to a full container, the operator no longer must necessarily switch containers at an unpredictable instance as they are drawn empty, but can necessarily schedule convenient and inexpensive routine maintenance to refill the treatment unit with treatment agent.

It should be appreciated that the present invention is not limited to the size, number and type of containers which are utilized to contain the treatment agent, such as an inhibitor agent and an anti-biofouling agent to the extent the treatment unit is able to maintain its self-contained characteristic such that it can be easily and readily adapted for use, particularly with respect to small to medium-sized aqueous systems, such as water cooling systems of less than about 100 ton capacity. In this regard, the containers include sizes that are less than those of containers used in conventional treatment units, such as five gallon-sized containers. In an embodiment, the containers are less than five gallons in size, preferably about one gallon in size or less and/or preferably a weight of about nine pounds or less when full to capacity with the treatment agent.

In an embodiment, the apparatus of the present invention is powered by a 12 volt power source 56, preferably 12 volt direct current (12 vdc) supplied by any suitable deep cycle rechargeable 12 volt battery as shown in FIG. 2. The battery can be contained within the treatment unit. The adaptability of a 12 volt power source for use with the treatment unit of the present invention facilitates the ease of handling and operating the treatment unit as compared to conventional treatment that utilizes higher voltage, such as main power at 112 volts. This can be particularly beneficial where an external power source is non-existent due to the remoteness of the location of the aqueous water system. In a preferred embodiment, the treatment unit includes a pair of 12 vdc solar cells 58 to maintain a charged battery, thus eliminating the necessity of any external power as shown in FIG. 2.

It should be appreciated that the power can be supplied to the electrical components of the treatment unit in a variety of different ways. For example, the power can be supplied via a 12 vdc buss 59 as illustrated in FIG. 2.

Figure 4A:
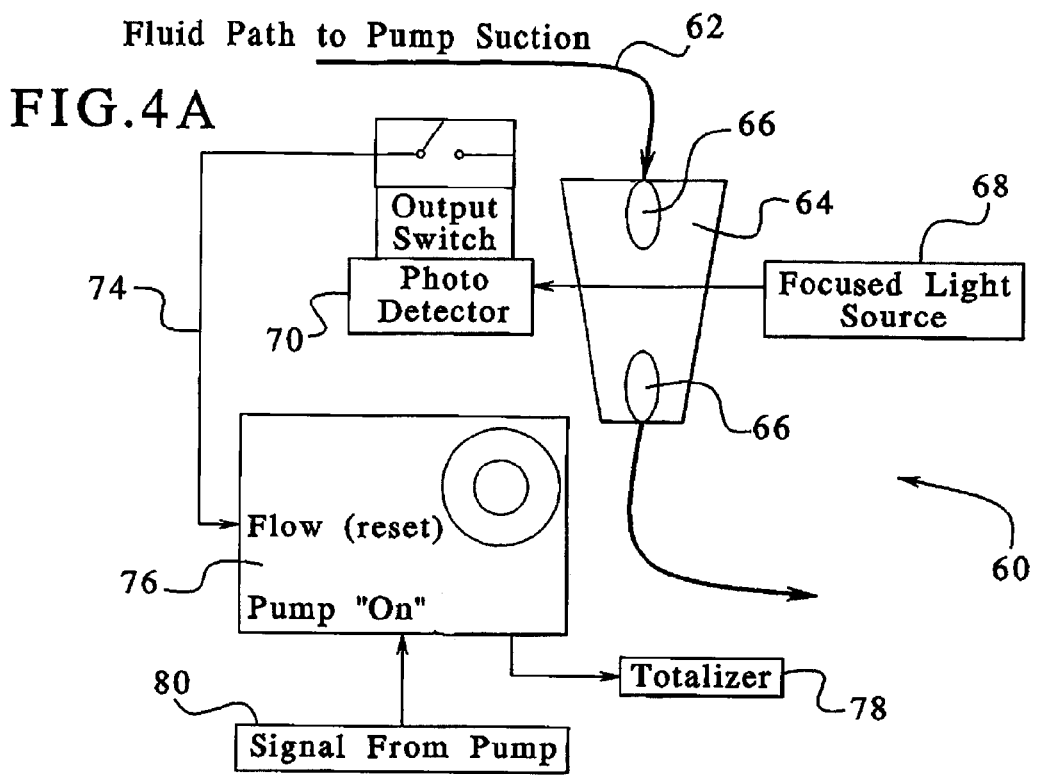
FIGS. 4A and 4B are schematic diagrams of a drip detector of the treatment unit as shown in FIG. 1A.
Figure 4B:
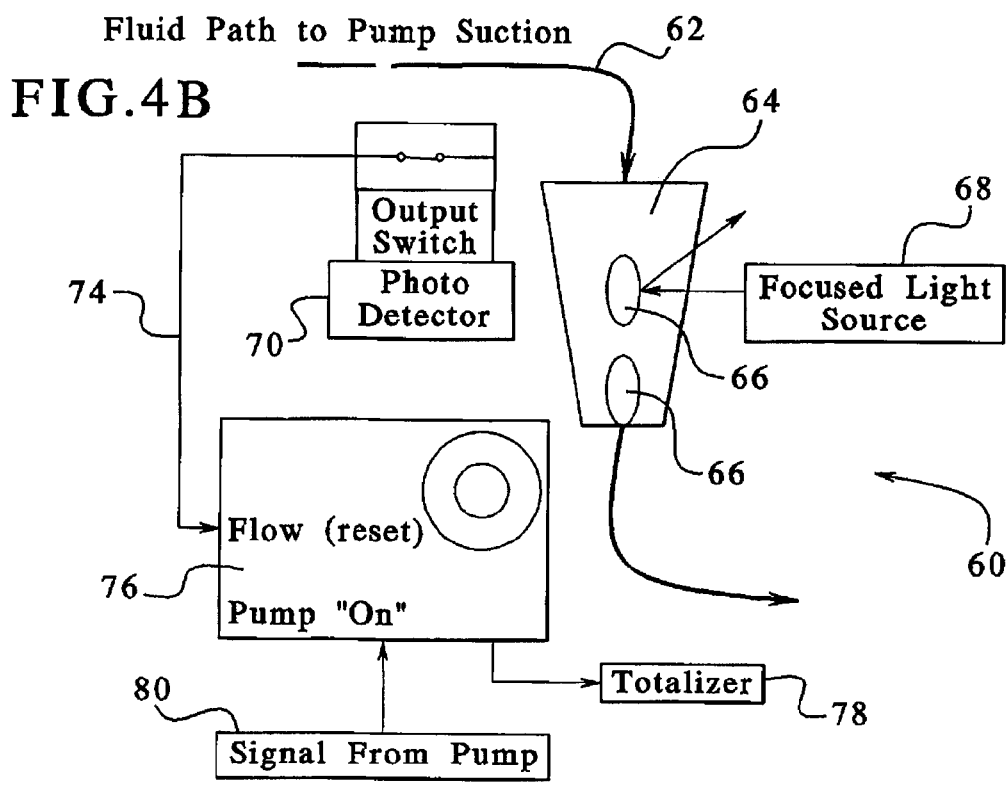

In an embodiment, the treatment unit can include a drip detector 60 for monitoring the flow of the treatment agent to the feed pump as shown in FIG. 2. The drip detector 60 can include any suitable and known drip detector 60 and can be configured in any suitable way such that it can properly function to monitor the treatment agent flow. As shown in FIGS. 4A and 4B, for example, the drip detection can be installed in the suction tubing 62 connected to the feed pump. The drip detector 60 includes a drip chamber 64 with a fixed orifice. As the treatment agent 66 is drawn through the drip chamber 64, it forms into drops. The drops then fall through the chamber, thus breaking the light path 68 of a fixed beam photosensor 70 or other like sensor. The photosensor 70 senses the change and sends a signal 74 to a recording circuit 76 which in turn can display 78 the total drop count. The drop count and frequency is compared to a signal 80 indicating a pump run time. If the frequency does not correlate to the pump run time, an alarm signal 82 (as indicated in FIG. 2) is generated and an alarm light or other like mechanism is energized, thus indicating a problem in the feed of the treatment agent.

It should be appreciated that the drip detector can be configured in a variety of different ways. For example, the pump run time signal can be directed to the drip detector via the controller instead of the pump.

The self-contained treatment unit of the present invention can be adapted for use in a variety of different configurations as previously d cussed. For example, the treatment unit can be mounted directly to the aqueous system, such As the water cooling system. It may also be installed as a standalone unit located in proximity to the aqueous system. It should also be appreciated that the electrical connections between the various components of the apparatus, such as the controller, feed pumps, bleed pump and sensor can be arranged in any suitable way and routed through any suitable number of electrical switches or the like.

Further, the self-contained treatment unit of the present invention can be applied to a variety of different aqueous systems to control and/or monitor the treatment of scale, corrosion, biofouling, the like conditions or combinations thereof within the aqueous water system. The aqueous systems or industrial water systems can include, but are not limited to, water cooling systems, such as cooling tower, evaporative condenser and the like, cooling tower water systems (including open recirculating, closed and once-through systems and the like); petroleum wells, downhole formations, geothermal wells and other oil field applications; boilers and boiler water systems; mineral process waters including mineral washing, flotation and benefaction; paper mill digesters, washers, bleach plants and white water systems; black liquor evaporators in the pulp industry; gas scrubbers and air washers; continuous casting processes in the metallurgical industry; air conditioning and refrigeration systems; industrial and petroleum process water; indirect contact cooling and heating water, such as nasteurization water; water reclamation and purification systems; membrane filtration water systems; food processing streams (meat, vegetable, sugar beets, sugar cane, grain, poultry, fruit and soybean); and waste treatment systems as well as in clarifiers, liquid-solid applications, municipal sewage treatment and industrial or municipal water systems.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that all such changes and modifications be covered by the appended claims.

What is claimed is:

1. An apparatus for self-contained treatment of an aqueous system comprising:
   a housing enclosing a controller, a feed pump and a treatment agent contained within one or more containers;
   a sensor electrically communicating with the controller for measuring a parameter of water within the aqueous system;
   a bleed pump electrically communicating with the controller such that the controller controllably activate the bleed pump when the parameter is at or exceeds a predetermined level wherein the bleed pump removes water from the aqueous system upon activation; and
   the feed pump electrically communicating with the controller such that the controller controllably activates the feed pump during activation of the bleed pump wherein the feed pump acts to deliver the treatment agent to the water in an aqueous system, wherein the apparatus includes a first container connected to the feed pump and a second container hydraulically connected to the first container such that the second container feeds the treatment agent into the first container as the treatment agent is delivered to the feed pump.

2. The apparatus of claim 1 wherein the treatment agent includes a scale inhibitor agent, a corrosion inhibitor agent, an anti-biofouling agent or combinations thereof.

3. The apparatus of claim 1 wherein the controller electrically communicates with the feed pump, the bleed pump or both via a timing device located within the housing.

4. The apparatus of claim 1 where the apparatus comprises a 12 volt power source, supplied by a deep cycle rechargeable 12 volt battery, wherein said power source provides power to the apparatus.

5. The apparatus of claim 1 wherein the bleed pump is a submersible pump that is located within the aqueous system.

6. The apparatus of claim 1 wherein the sensor is selected from the group consisting of pH, ion selective electrode, oxidation/reduction potential, conductivity, oxygen, temperature, capacitance, piezoelectric transducer or combinations thereof.

7. An apparatus for monitoring and controlling treatment of a water cooling system comprising:
   a self-contained treatment unit including a control device, an inhibitor feed pump and an inhibitor agent contained within one or more containers wherein the self-contained treatment unit is powered by a 12 volt power source, wherein said 12 volt power source is a deep cycle rechargeable 12 volt battery;
   a conductivity sensor electrically communicating with the control device such that the conductivity sensor transmits a signal to the control device indicative of electrical conductivity of water from the water cooling system;
   a submersible bleed pump electrically communicating with the control device such that the control device controllably activates the submersible bleed pump when the signal is at or exceeds a preset value wherein the submersible bleed pump removes water from the water cooling system upon activation thereof; and
   the inhibitor feed pump electrically communicating with the control device such that the control device controllably activates the inhibitor feed pump wherein the inhibitor feed pump acts to deliver the inhibitor agent to the water cooling system for treating scale and/or corrosion, wherein the apparatus includes a first container connected to the feed pump and a second container hydraulically connected to the first container such that the second container feeds the treatment agent into the first container as the treatment agent is delivered to the feed pump.

8. The apparatus of claim 7 wherein the submersible bleed pump and inhibitor feed pump each electrically communicate with the control device via a timing device located in the housing.

9. The apparatus of claim 7 wherein the treatment unit further comprises a drip detector for monitoring flow of the inhibitor agent to the inhibitor feed pump.

10. The apparatus of claim 7 wherein the treatment unit further comprises a feed pump adapted to controllably deliver an anti-biofouling agent from one or more containers to the water cooling system.

11. A system for monitoring and controlling treatment of an aqueous system comprising: a sensor located within the aqueous system for measuring a parameter of water within the aqueous system which is capable of varying with respect to changes in the aqueous system due to scale, corrosion and/or biofouling;
   a submersible bleed pump for removing water from the aqueous system; and
   a self-contained treatment unit electrically communicating with the sensor and the bleed pump such that the self-contained treatment unit controllably activates the submersible bleed pump to remove water from the aqueous system when the parameter of water is at or exceeds a predetermined level, the treatment unit comprising a housing for enclosing a controller, an inhibitor feed pump, an inhibitor agent contained within one or more containers wherein the controller controllably activates the inhibitor feed pump to deliver the inhibitor agent to the aqueous system during activation of the bleed pump, wherein the system includes a first container connected to the feed pump and a second container hydraulically connected to the first container such that the second container feeds the inhibitor agent into the first container as the inhibitor agent is delivered to the feed pump.

12. The system of claim 11 further comprising one or more timing devices each communicating with the controller to controllably activate the submersible bleed pump, the inhibitor feed pump or both wherein the timing devices are located within the housing.

13. The system of claim 11 wherein the self-contained treatment unit further comprises a feed pump for controllably delivering an anti-biofouling agent from one or more hydraulically connected containers to the aqueous system during activation of the bleed pump.

14. The system of claim 13 wherein the self-contained treatment unit further comprises a detector for monitoring flow of the inhibitor agent, the anti-biofouling agent or both.

* * * * *